(12) United States Patent
Miyayama et al.

(10) Patent No.: US 9,675,886 B2
(45) Date of Patent: Jun. 13, 2017

(54) METHOD, COMPUTER, AND PROGRAM FOR PROVIDING GAME

(71) Applicant: GREE, INC., Tokyo (JP)

(72) Inventors: Jun Miyayama, Tokyo (JP); Michio Hara, Tokyo (JP)

(73) Assignee: Gree, Inc., Tokyo (JP)

( * ) Notice: Subject to any disclaimer, the term of this patent is extended or adjusted under 35 U.S.C. 154(b) by 256 days.

(21) Appl. No.: 14/467,244

(22) Filed: Aug. 25, 2014

(65) Prior Publication Data

US 2015/0209671 A1  Jul. 30, 2015

(30) Foreign Application Priority Data

Jan. 28, 2014  (JP) ................. 2014-012956

(51) Int. Cl.
*A63F 13/45* (2014.01)

(52) U.S. Cl.
CPC ........ *A63F 13/45* (2014.09); *A63F 2300/552* (2013.01)

(58) Field of Classification Search
CPC ..................................................... A63F 13/45
See application file for complete search history.

(56) References Cited

U.S. PATENT DOCUMENTS

| | | | |
|---|---|---|---|
| 6,179,713 B1* | 1/2001 | James | A63F 13/335 463/1 |
| 2004/0139468 A1* | 7/2004 | Kidd | G06F 17/30575 725/86 |
| 2008/0096622 A1* | 4/2008 | Terada | A63F 13/10 463/2 |
| 2009/0131174 A1* | 5/2009 | Hutchinson-Kay | G07F 17/32 463/42 |
| 2014/0157246 A1* | 6/2014 | Tomlinson | G06F 8/47 717/140 |

FOREIGN PATENT DOCUMENTS

| | | |
|---|---|---|
| JP | 2002253866 | 9/2002 |
| JP | 2005323827 | 11/2005 |
| JP | 2006346088 | 12/2006 |
| JP | 2013128603 | 7/2013 |
| JP | 201349388 | 10/2013 |
| JP | 20135388016 | 10/2013 |
| JP | 2013248178 | 12/2013 |

\* cited by examiner

*Primary Examiner* — Corbett B Coburn
(74) *Attorney, Agent, or Firm* — Patterson Thuente Pedersen P.A.

(57) ABSTRACT

A controller collectively transmits game view data of a game having a set of a plurality of rounds to a user terminal. The game view data corresponds to a first subset of rounds including a predetermined number of rounds in the plurality of rounds. The controller collectively transmits game view data corresponding to a second subset of rounds to the user terminal responsive to detecting that the first subset of the rounds is completed. The second subset of rounds includes the predetermined number of rounds subsequent to the completed rounds.

10 Claims, 6 Drawing Sheets

METHOD, COMPUTER, AND PROGRAM FOR PROVIDING GAME

RELATED APPLICATIONS

The application claims the benefit of Japanese Patent Application No. 2014-012956, filed Jan. 28, 2014, said application being hereby fully incorporated herein by reference.

FIELD OF THE INVENTION

The present invention relates to a method, a computer, and a program for efficiently providing game content through a web application.

BACKGROUND OF THE INVENTION

Today, application software such as various types of online games are provided to users who use computer terminals such as smartphones. A native application is directly interpreted by a microprocessor of a terminal such as a personal computer or a smartphone and executed. On the other hand, a web application is executed on a browser of the terminal regardless of the type of the terminal.

When game content is provided, a server apparatus can operate according to the progress status of the game to prevent decrease in user's desire for the continuation of the game (for example, see Japanese Laid-Open Patent Publication No. 2013-128603). The server apparatus causes the game to progress while communicating with the terminal of the user. In a case where a first event occurs during the game in progress, the server apparatus reduces a parameter value for the game target and creates first display data corresponding thereto. In addition, the server apparatus counts the frequency of occurrence of the first event, and sets a winning rate of the occurrence of a second event based on the frequency of the occurrence of the first event and the parameter value. The server apparatus performs a lottery to determine whether the second event occurs based on the winning rate thus set. In a case where the second event occurs, the server apparatus reduces the parameter value for the game target, creates second display data corresponding thereto, and transmits the first display data and the second display data to the terminal.

However, when game content corresponding to a plurality of rounds is transmitted at a time, time is required for transmission, and thus, the user is kept waiting for the time until the game starts. Specifically, in a case where a variety of content is provided to the user for increasing user's interest, the amount of transmitted content tends to increase. On the other hand, when the game content is transmitted at every round, it prevents a smooth progress of the game in some cases.

SUMMARY OF THE INVENTION

Accordingly, it is an objective of the invention to provide a method, a computer, and a program for efficiently providing game content through a web application. To achieve the foregoing objective and in accordance with one aspect of the present invention, a method for providing a game is provided. The method includes: by a controller, collectively transmitting game view data of a game having a set of a plurality of rounds to a user terminal, the game view data corresponding to a first subset of rounds including a predetermined number of rounds in the plurality of rounds; and responsive to detecting that the first subset of the rounds is completed, collectively transmitting, to the user terminal, game view data corresponding to a second subset of rounds including the predetermined number of rounds subsequent to the completed rounds.

In accordance with another aspect of the present invention, a computer that includes a controller is provided. The controller is operative to collectively transmit game view data of a game having a set of a plurality of rounds to a user terminal, the game view data corresponding to a first subset of rounds including a predetermined number of rounds in the plurality of rounds. The controller is also operative to, responsive to detecting that the first subset of the rounds is completed, collectively transmit, to the user terminal, game view data corresponding to a second subset of rounds including the predetermined number of rounds subsequent to the completed rounds.

In accordance with a further aspect of the present invention, a non-transitory computer-readable storage medium with a program stored therein for executing a method is provided. The method includes: by a controller, collectively transmitting game view data of a game having a set of a plurality of rounds to a user terminal, the game view data corresponding to a first subset of rounds including a predetermined number of rounds in the plurality of rounds; and responsive to detecting that the first subset of the rounds is completed, collectively transmitting, to the user terminal, game view data corresponding to a second subset of rounds including the predetermined number of rounds subsequent to the completed rounds.

(1) The game providing method to solve the above-mentioned problem uses a game providing computer that includes a storage section configured to manage a game having a plurality of rounds and a controller connected to a user terminal. The controller collectively transmits the game view data of rounds of a subtotal number to the user terminal that uses the game, and collectively transmits the game view data by the subtotal round count to the user terminal from the round subsequent to the completed rounds transmitted to the user terminal. With this configuration, the waiting time until the game starts is reduced, and allows the game to efficiently progress.

(2) In the game providing method, in a case where it is detected that the rounds of the subtotal round count transmitted to the user terminal have been completed, the controller preferably transmits the view data presenting intermediate result information to the user terminal. With this configuration, it is possible to grasp that battles of the subtotal round count have been completed.

(3) In the game providing method, in a case where it is detected that the rounds of the subtotal round count transmitted to the user terminal are completed, the controller preferably transmits, to the user terminal, the view data for checking the user of his/her willingness to continue with the battle. With this configuration, it is possible to retire from the battle in the middle of the rounds.

(4) In the game providing method, in a case where it is detected that the rounds of the subtotal round count transmitted to the user terminal are completed, the controller preferably transmits the view data for informing the user of an achieved round count to the user terminal. With this configuration, it is possible to grasp the number of completed rounds.

(5) In the game providing method, in a case where it is detected that the rounds of the subtotal round count transmitted to the user terminal are completed, the controller preferably identifies a user related to the user who uses the user terminal, identifies the progress status of the game of the related user, and transmits the view data for informing the progress information of the related user to the user terminal. With this configuration, it is possible to grasp the progress status of the related user.

(6) In the game providing method, the controller preferably identifies the terminal attribute of the user terminal and determines the subtotal round count based on the terminal attribute. With this configuration, it is possible to efficiently transmit the game view data while taking the status of the user terminal into consideration.

(7) In the game providing method, the storage section preferably stores a user attribute for each user, and the controller preferably identifies the user attribute of the user who uses the user terminal using the storage section and determines the subtotal round count based on the user attribute. With this configuration, it is possible to efficiently transmit the game view data while taking the user status into consideration.

(8) In the game providing method, the storage section preferably stores the relevance of each round, and the controller identifies the relevance to a newly transmitted round using the storage section and determines the subtotal round count so that highly associated rounds can be collectively transmitted based on the relevance. With this configuration, it is possible to efficiently transmit the game view data while taking the progress of the game into consideration.

(9) In the game providing method, the controller preferably specifies the upper limit value of the subtotal round count to be collectively transmitted to the user terminal in the game. If a desired number of rounds equal to or less than the upper limit value is acquired from the user terminal, the desired number of rounds is preferably determined as the subtotal round count. With this configuration, it is possible to efficiently transmit the game view data while taking the user's status and desire into consideration.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, a method for providing a game according to one embodiment will be described with reference to FIGS. 1 to 4. In the present embodiment, it is assumed that game content is provided to a user.

Figure 1:
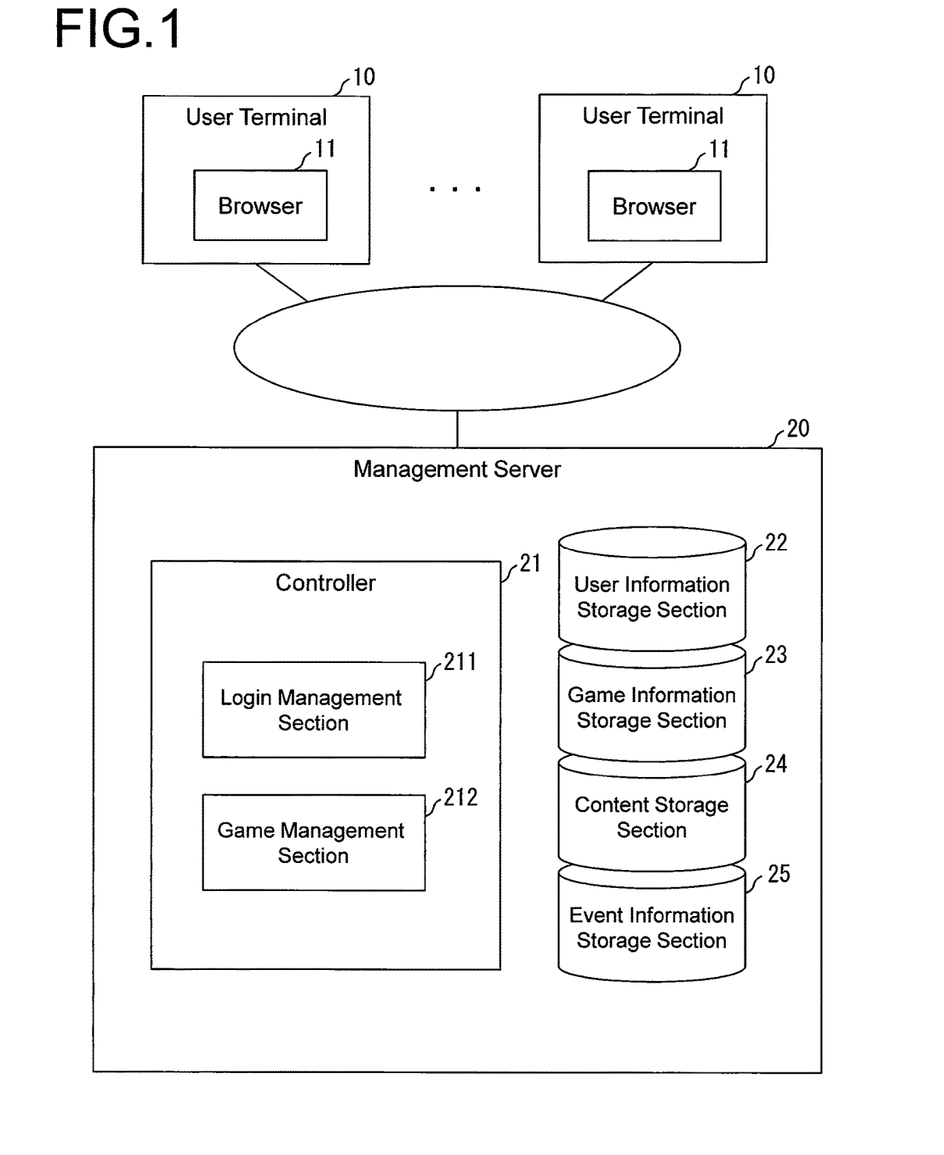
FIG. 1 is a diagram schematically illustrating a system according to one embodiment.

As illustrated in FIG. 1, a user terminal 10 and a management server 20 (computer) are used in the method of the present embodiment. The user terminal 10 and the management server 20 are connected to each other through a network such as the Internet.

The user terminal 10 is a computer terminal (an information processing terminal such as a smartphone) that is used by a user who plays a game. The user terminal 10 includes a browser 11 (program), through which the game content provided from the management server 20 is used. The browser 11 stores view data acquired from the management server 20 in the browser memory, and outputs the view data to the display.

Figure 4:
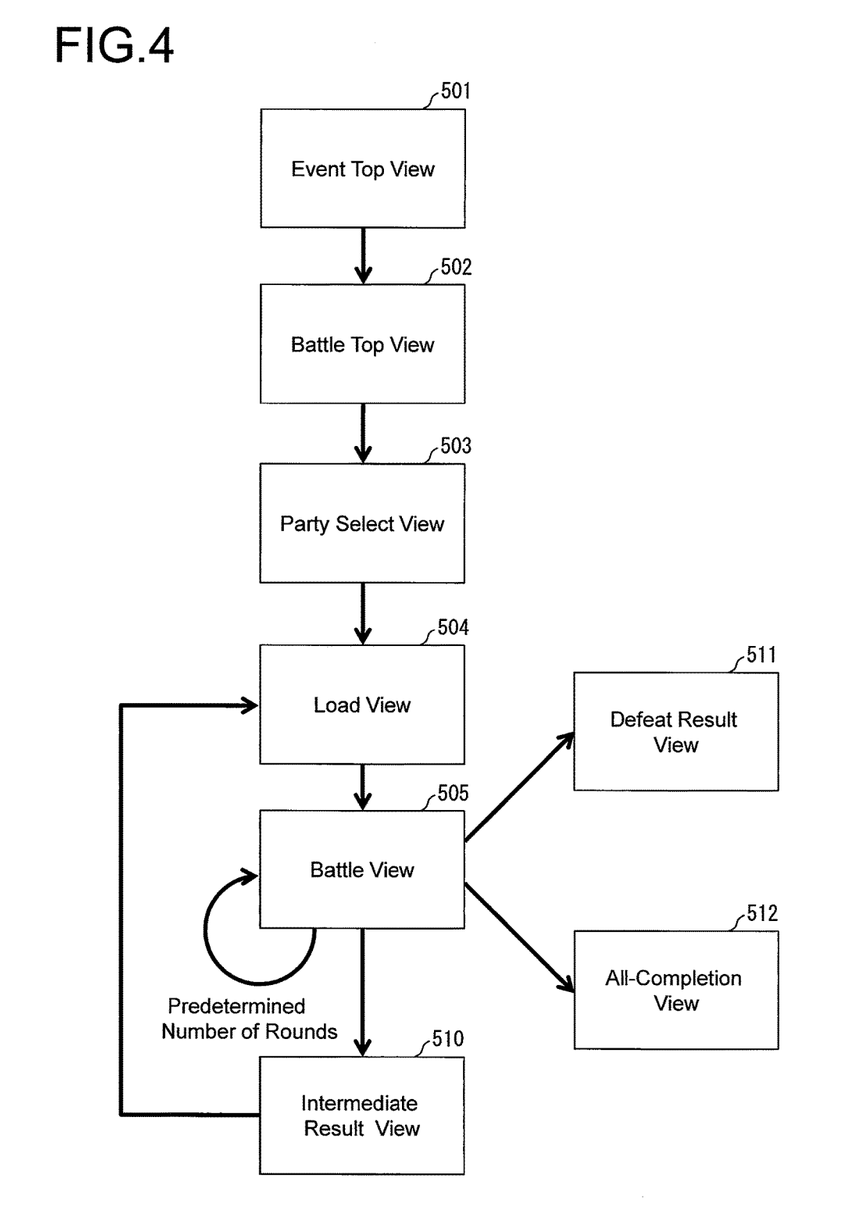
FIG. 4 is an explanatory diagram describing a view in the procedures of FIGS. 2 and 3.

As illustrated in FIG. 4, in the present embodiment, an event top view 501, a battle top view 502, a party select view 503, a load view 504, and a battle view 505 are used. In addition, an intermediate result view 510, a defeat result view 511, and an all-completion view 512 are used.

The event top view 501 is a view that introduces an event on the game.

The battle top view 502 is an initial view that is displayed before the game starts.

The party select view 503 is a view that is used to select other characters (fellows) to be included in the party of the user's character in the game and items to be used in the game. When the user's character starts the battle with the opponent's character (enemy) in the game, other characters join the battle together with the user's character. In the present example, a predetermined number of characters and items are selected from candidates such as a plurality of characters and items. In addition, another user's character participating in the game can also be selected as a fellow user.

The load view 504 is a wait view that is displayed during a period when view data (battle view data) of the battle view 505 is downloaded.

The battle view 505 is displayed when a battle is performed. In the present embodiment, the battle view 505 is changed for each round of a battle.

The intermediate result view 510 is set to present intermediate result information indicating the completed battles such as a predetermined number (a predetermined round count) of winning rounds in the battle. In addition, the intermediate result view 510, for example, includes an indication indicating an achieved round count such as the total number of completed rounds in this game and an indication for checking the user of his/her willingness to continue with the battle such as a selectable icon.

The defeat result view 511 is displayed in a case where the user is defeated in the battle.

The all-completion view 512 is displayed in a case where all the rounds are completed.

The management server 20 is a server computer that provides various types of game content to the user terminal 10. In the present embodiment, a case where the server computer provides a battle game including a plurality of rounds to the user is assumed. The game content is written HTML5, and executed on the browser.

As illustrated in FIG. 1, the management server 20 includes a controller 21, which includes a CPU, a RAM, a ROM and the like, a user information storage section 22, a game information storage section 23, a content storage section 24, and an event information storage section 25. The controller 21 functions as a login management section 211 and a game management section 212 by executing a program for providing a game.

The login management section 211 manages users who use the game. In the present embodiment, in a case where login authentication is successfully passed in the login management section 211, a session for the user terminal 10 is handed over to the game management section 212.

The game management section 212 transmits the game content to each user terminal 10. The game management section 212 stores game status information in a temporary memory. The game management section 212 registers the game status information at the time when the user starts the game, and deletes the information at the time when the user ends the game. The game status information includes a user ID, a game ID, a party, and information relating to a progress status.

In a user ID data area, data relating to an identifier for identifying a user who uses the game is recorded.

In a game ID data area, data relating to an identifier for identifying the game that is used by the user is recorded.

In a party data area, data relating to an identifier for identifying a character selected as a fellow and an item for use in the game is recorded. In addition, data relating to another user (friend) corresponding to the character selected as a fellow user is recorded.

In a progress status data area, data relating to the progress status in the game is recorded.

The user information storage section 22 stores user information relating to the user who uses the game. The user information storage section 22 stores user information at the time when the user is registered. The user information includes data relating to a user ID, a login password, an activated game, and user relevance.

In the user ID data area, data relating to an identifier for identifying each user is recorded.

In a login password data area, data for the authentication at the time of performing login into the management server 20 is recorded.

In an activated game data area, data relating to an identifier (game ID) for identifying the game that is used by the user is recorded. The title of the game can be identified by the game ID.

In a user relevance data area, data relating to relevance to another user is recorded. Examples of another user include a user belonging to the same group as that of the user who uses the game, a user who is a friend in the game, and a user who is selected as a fellow in a specific battle. In the data area, data relating to an identifier for identifying another user or a group to which the other user belongs is recorded.

The game information storage section 23 stores game management information relating to the game that is used by the user. The game information storage section 23 stores the game management information when the user registers the game for use, and updates the information when the user plays the game. In the game management information, data relating to a user ID, an activated game, and a progress status is recorded.

In the user ID data area, data relating to an identifier for identifying each user is recorded.

In the activated game data area, data relating to an identifier for identifying each game that is used by the user is recorded.

In the progress status data area, data relating to the progress status of the game by the user is recorded. In the data area, for example, information relating to an item possessed by the character of the user, the ability of the character of the user, the achieved round, and the like is recorded.

The content storage section 24 stores content information relating to game views provided to the user terminal 10. The content storage section 24 stores the content information when the game to be provided to the user is registered. In the content information, data relating to a game ID, a view ID, and a game view is recorded.

In the game ID data area, data relating to an identifier for identifying each game is recorded.

In a view ID data area, data relating to an identifier for identifying a view used in the game is recorded. The view ID can identify the event top view 501 to the all-completion view 512 illustrated in FIG. 4, and also identify the battle view 505 of each round.

In a game view data area, data relating to a view used in the round is recorded. In the present embodiment, in the game view data area, view data for displaying the event top view 501 to the all-completion view 512 illustrated in FIG. 4 on the browser is recorded.

The event information storage section 25 stores event information relating to an event of each game. The event information storage section 25 stores the event information when an event is registered. In the event information, data relating to a game ID and event content is recorded.

In the game ID data area, data relating to an identifier for identifying each game is recorded.

In an event content data area, data relating to content of an event that is held in each game is recorded.

Game Providing Process

Figure 2:
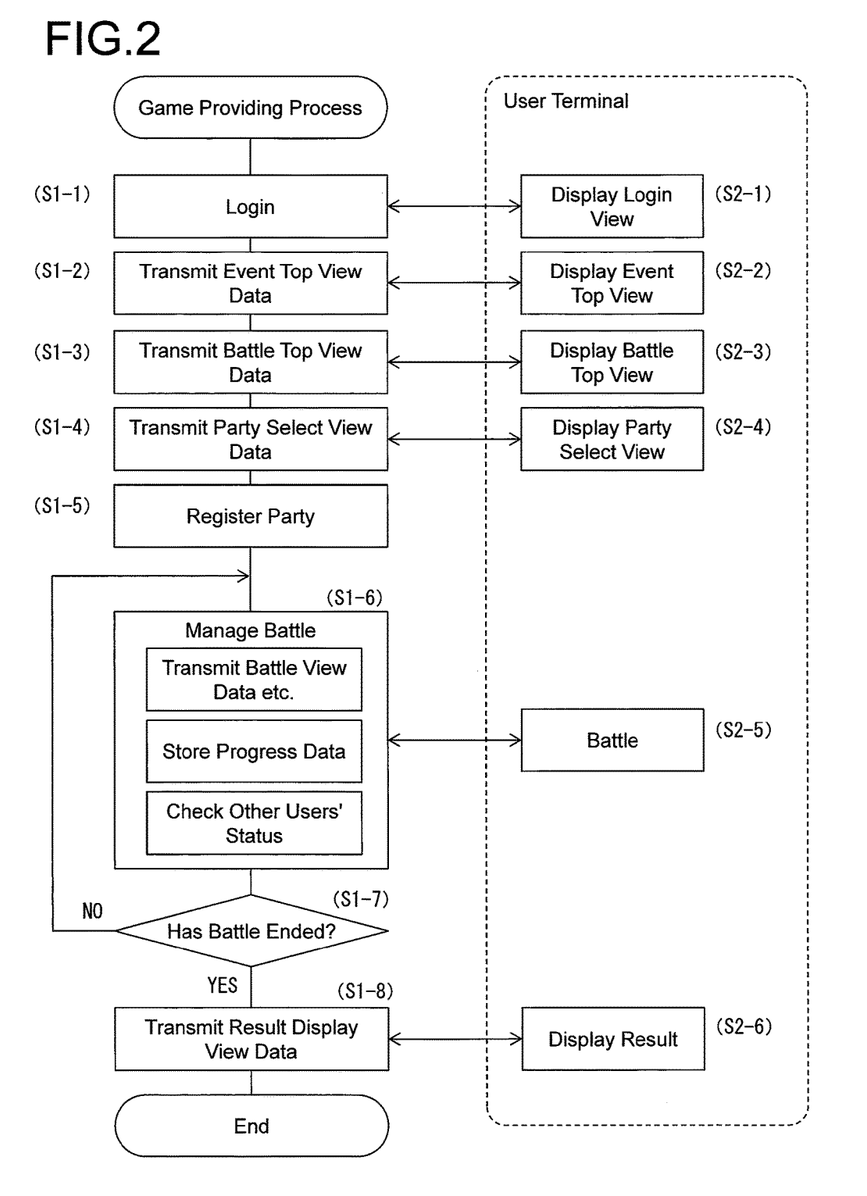
FIGS. 2 and 3 are explanatory diagrams describing procedures of the system of FIG. 1.

A game providing process will be described with reference to FIG. 2.

First, the controller 21 of the management server 20 performs a login process (Step S1-1). Specifically, when playing a game, a user uses the user terminal 10 to access the management server 20, which manages a desired game. In this case, the login management section 211 of the controller 21 transmits login view data to the user terminal 10. In this case, the user terminal 10 performs a login view display process (Step S2-1). Specifically, the browser 11 of the user terminal 10 outputs the login view to a display. The login management section 211 acquires a user ID and a login password that are input in the login view. When the user ID and the login password are registered in the user information storage section 22, the login management section 211 authenticates the login as successful and completes the login process on a desired game ID acquired from the user terminal 10.

Next, the controller 21 of the management server 20 performs a transmission process of event top view data (Step S1-2). Specifically, the game management section 212 of the controller 21 acquires event information, in which the desired game ID is recorded, from the event information storage section 25. Next, the game management section 212 generates event top view data, in which the acquired event information is included. The game management section 212 transmits the event top view data to the user terminal 10. In this case, the user terminal 10 performs a display process of an event top view (Step S2-2). Specifically, the browser 11 of the user terminal 10 outputs the event top view acquired from the management server 20 to the display. The user checks the content displayed on the event top view. In a case where a battle is performed, the user selects a battle start icon. In this case, the browser 11 transmits a battle start notice to the management server 20.

Next, the controller 21 of the management server 20 performs a transmission process of battle top view data (Step S1-3). Specifically, the game management section 212 of the controller 21 generates game status information associated with the user ID, and stores the information in the temporary memory. The game management section 212 transmits the battle top view data. In this case, the user terminal 10 performs a display process of a battle top view (Step S2-3).

Specifically, the browser 11 of the user terminal 10 outputs the battle top view acquired from the management server 20 to the display.

Next, the controller 21 of the management server 20 performs a transmission process of party select view data (Step S1-4). Specifically, the game management section 212 of the controller 21 outputs a plurality of characters (which are selectable as fellows) or item candidates for use. Other users who use the game are identified by the game information storage section 23. The game management section 212 generates party select view data, which is used to display party information indicating the fellow characters or item candidates and a user, and transmits the data to the user terminal 10. In this case, the user terminal 10 performs a display process of a party select view (Step S2-4). Specifically, the browser 11 of the user terminal 10 outputs the party select view based on the party select view data acquired from the management server 20. The user selects, if desired, a desired fellow character or item and other users to form a party. In this case, the browser 11 transmits the selected party information indicating the selected fellow character or item candidate and a user to the management server 20.

Next, the controller 21 of the management server 20 performs a party registration process (Step S1-5). Specifically, the game management section 212 of the controller 21 registers the selection party information in the game status information of the temporary memory in association with the user ID and the game ID.

Next, the controller 21 of the management server 20 performs a battle management process (Step S1-6). Specifically, the game management section 212 of the controller 21 identifies the game progress status in the user terminal 10. In a case where the battle view data is transmitted for the first time, the game management section 212 collectively transmits the view data of the load view 504 and the battle views 505 from the first round and a predetermined number of successive rounds to the user terminal 10. On the other hand, in a case where progress data is acquired from the user terminal 10, the game management section 212 collectively transmits the view data of the battle views 505 corresponding to the predetermined number of successive rounds from a round subsequent to the end round (that is, the last round in the predetermined round count) to the user terminal 10.

In this case, the user terminal 10 performs a battle process as described below (Step S2-5).

Further, in the battle management process (Step S1-6), in a case where it is detected that the battle of the predetermined number of rounds is completed, the controller 21 of the management server 20 transmits the view data of the intermediate result view 510 to the user terminal 10. In addition, the view data of the intermediate result view 510 may be transmitted to the user terminal 10 in advance, and the browser 11 may output the intermediate result view 510 at the time when it is detected that the battle of the predetermined number of rounds is completed.

Further, the controller 21 of the management server 20 performs a storage process of the progress data. Specifically, in a case where the progress data of the battle is acquired from the user terminal 10, the game management section 212 of the controller 21 updates the game status information of the temporary memory. In addition, the game management section 212 updates the status recorded in the game management information of the game information storage section 23.

Further, the controller 21 of the management server 20 performs a checking process of other users' status. Specifically, the game management section 212 of the controller 21 identifies, in the temporary memory, the status of other users who belong to the same group as that of the user. The game management section 212 includes the identified status information of other users in the load view 504, and transmits the information to the user terminal 10.

Next, the controller 21 of the management server 20 performs a determining process on whether the battle has ended (Step S1-7). The end of the battle is determined based on whether the data acquired from the user terminal 10 is the end data or the progress data.

In a case where the data acquired from the user terminal 10 is the progress data, the controller 21 determines that the battle has not ended ("NO" in Step S1-7), returns to the battle management process (Step S1-6), and transmits new battle view data.

In contrast, in a case where the data acquired from the user terminal 10 is the end data, the controller 21 determines that the battle has ended ("YES" in Step S1-7), and performs a transmission process of result display view data (Step S1-8). Specifically, the game management section 212 of the controller 21 identifies the progress status (such as an end round) recorded in the temporary memory. In addition, the game management section 212 updates the status recorded in the game management information of the game information storage section 23. The game management section 212 generates result display view data that includes information relating to the progress status. As the result display view data, any one of the defeat result view 511 and the all-completion view 512 is transmitted to the user terminal 10. In this case, the user terminal 10 performs a result display process (Step S2-6), specifically, the browser 11 of the user terminal 10 outputs a result display view based on the data acquired from the management server 20.

In a case where it is detected that the battle has resulted in defeat or retirement, the game management section 212 transmits the view data of the defeat result view 511 to the user terminal 10. Further, in a case where it is detected that all the rounds have been completed, the game management section 212 transmits the view data of the all-completion view 512 to the user terminal 10.

Battle Process

Figure 3:
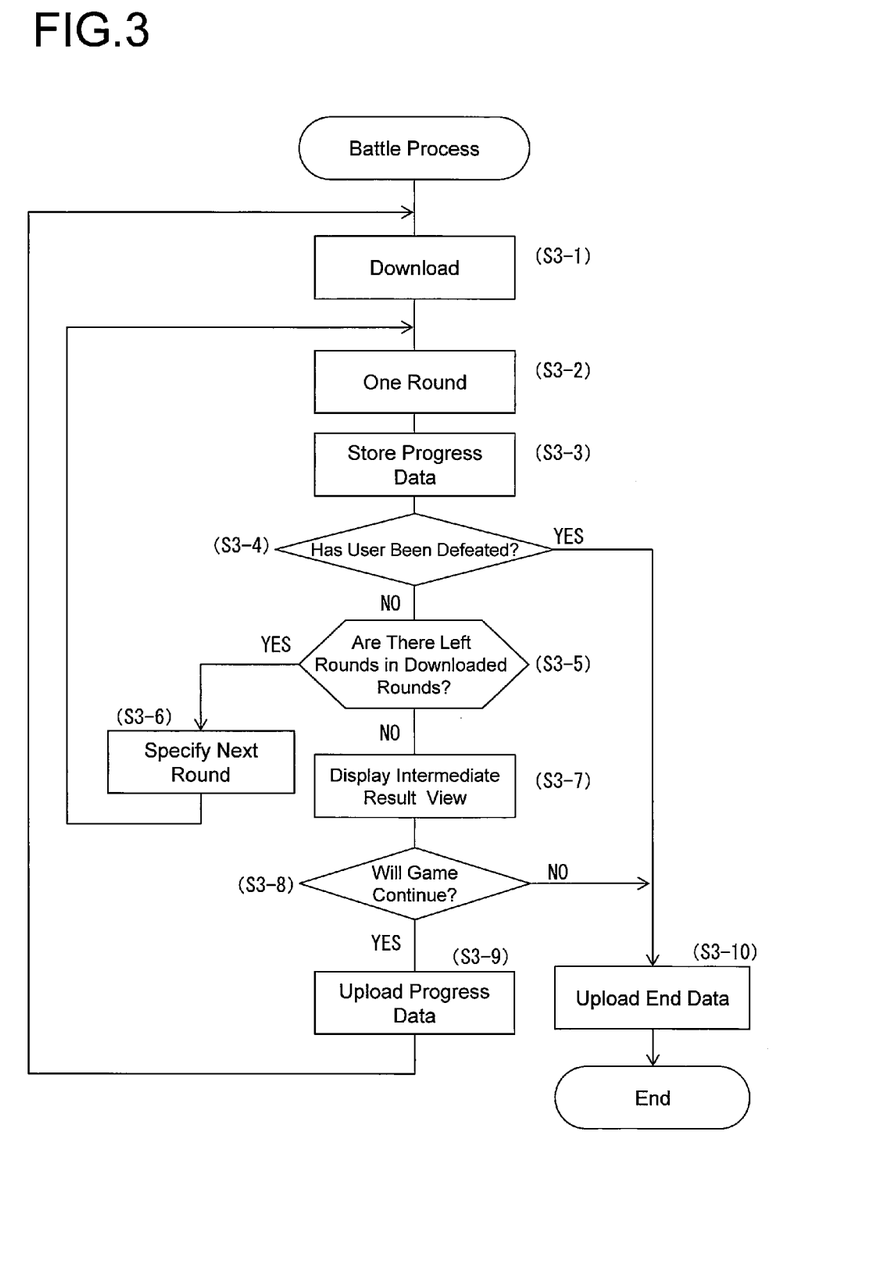

Next, the battle process (Step S2-5) in the user terminal 10 will be described with reference to FIG. 3. In the present embodiment, in a case where the victory of the user lasts in the battles up to the predetermined number of rounds (for example, three rounds), the controller 21 of the management server 20 transmits the battle view data of a predetermined number of new rounds after the end of the predetermined number of the winning rounds. In addition, the battle view data of the predetermined number of new rounds is transmitted only in a case where the user makes a selection to continue with the battle process.

The user terminal 10 performs a download process (Step S3-1). Specifically, the browser 11 of the user terminal 10 downloads the battle view data of the game from the management server 20. In this case, the browser 11 displays the load view 504 including a message indicating that the battle view data of a new round is being downloaded. In addition, in a case where the progress status of other users belonging to the same group as that of the user or a friend in the game is acquired from the management server 20, the browser 11 displays the progress status in the load view 504.

After completely downloading the battle view data, the user terminal 10 performs a process of one round among the predetermined number of downloaded rounds (Step S3-2). Specifically, the browser 11 of the user terminal 10 temporarily stores the battle view data acquired from the management server 20 in the browser memory. Next, the battle view 505 of a round (the first round immediately after the download) that has not yet been used in the battle is output. The browser 11 performs the battle process based on information included in the battle view 505. In this case, the information regarding the round of the finished battle is recorded.

Next, the user terminal 10 performs a progress data storage process (Step S3-3). Specifically, the browser 11 of the user terminal 10 temporarily stores the progress information of the battle in the round in the browser memory of the user terminal 10.

In a case where it is detected that the battle in the round has ended, the user terminal 10 performs a determining process on whether the user has been defeated (Step S3-4). Specifically, the browser 11 of the user terminal 10 makes a determination on the winning or defeat of the battle in the round based on the progress information.

In a case where it is determined that the user has been defeated ("YES" in Step S3-4), the user terminal 10 performs an upload process on end data (Step S3-10). Specifically, the browser 11 of the user terminal 10 transmits the end data to the management server 20. The end data includes defeat data indicating that the user has been defeated, and outcome information (for example, gained items and the like) of the battle.

On the other hand, in a case where it is determined that the user has won (not defeated) ("NO" in Step S3-4), the user terminal 10 performs a determining process on whether there is left rounds (that is, remaining rounds), which has not yet been used in the battle, in the predetermined number of downloaded rounds (Step S3-5). Specifically, the browser 11 of the user terminal 10 checks whether there are remaining rounds in the rounds of the battle view temporarily stored in the browser memory.

In a case where it is determined that there is remaining rounds in the predetermined number of downloaded rounds ("YES" in Step S3-5), the user terminal 10 performs a specifying process of the next round (Step S3-6). Specifically, the browser 11 of the user terminal 10 specifies the battle view data of the round subsequent to the end round in the browser memory.

The user terminal 10 returns to the one round process (Step S3-2).

On the other hand, in a case where it is determined that there are no remaining rounds in the predetermined number of downloaded rounds (that is, the battle is done in all the rounds) ("NO" in Step S3-5), the user terminal 10 performs an intermediate result view displaying process (Step S3-7). Specifically, the browser 11 of the user terminal 10 informs the management server 20 of the victory (round completed), and outputs the intermediate result view 510, which displays a victory message. The intermediate result view 510 includes icons that are used by the user to select retirement or continuation of the game.

Next, the user terminal 10 performs a determining process on whether the game will be continued (Step S3-8). Specifically, the browser 11 of the user terminal 10 determines whether the game will be continued based on an icon selected by the user in the intermediate result view 510.

In a case where a retirement icon is selected in the intermediate result view 510 and thus it is determined that the game will not be continued ("NO" in Step S3-8), the user terminal 10 performs an upload process on the end data (Step S3-10). Specifically, the browser 11 of the user terminal 10 transmits the end data to the management server 20. The end data includes retirement data indicating that the user has selected retirement, and the outcome information up to this round (for example, gained items and the like).

On the other hand, in a case where a continuation icon is selected in the intermediate result view 510 and thus it is determined that the game will be continued ("YES" in Step S3-8), the user terminal 10 performs an upload process on the progress data (Step S3-9). Specifically, the browser 11 of the user terminal 10 transmits the progress data of the predetermined number of last rounds to the management server 20. The progress data includes data relating to the last end round in the user terminal 10 and the outcome information (for example, gained items and the like) of the predetermined number of last rounds. The user terminal 10 returns to the download process (Step S3-1).

According to the above embodiment, the following advantages are achieved.

(1) The controller 21 of the management server 20 performs the battle management process (Step S1-6). Specifically, the game management section 212 of the controller 21 collectively transmits the battle view data of a predetermined number of rounds to the user terminal 10. In a case where the battle view data of all the rounds is collectively transmitted, a waiting time until the transmission is ended becomes long. Further, in a case where the user is defeated in the middle of a round, the user will not use the battle view data of the subsequent round and the data will be wasted. On the other hand, in a case where the battle view data is transmitted at each round, the user should wait at the end of each battle until the battle of the next round starts. Since the battle view data is collectively transmitted at each predetermined number of rounds, the battle of the predetermined number of rounds can be continuously played. Further, unlike a case where the same battle view data for all the predetermined number of rounds is provided, the battle view 505 can be provided differently depending on the round, thereby raising interest of the user.

(2) The user terminal 10 performs the download process (Step S3-1). In this case, the browser 11 displays the load view 504, which includes a message indicating that the battle view data of a new round is being downloaded. With this configuration, the user can ascertain the download status.

In addition, in a case where the progress status of another user belonging to the same group as that of the user or another user included in the party is acquired from the management server 20, the browser 11 displays the acquired progress status in the load view 504. With this configuration, the user can ascertain the status of another user using a time taken for downloading.

(3) The user terminal 10 performs the intermediate result view displaying process (Step S3-7). The intermediate result view 510 includes the icons that are used by the user to select retirement or continuation of the game. With this configuration, the user can terminate the game in the middle of the rounds even if the user has not been defeated.

(4) The user terminal 10 performs the determining process on whether there are remaining rounds in the predetermined number of downloaded rounds (Step S3-5). In a case where it is determined that there are remaining rounds in the predetermined number of rounds ("YES" in Step S3-5), the user terminal 10 performs the specifying process of the next round (Step S3-6). With this configuration, the game can continue using the battle view data accumulated in the browser memory.

On the other hand, in a case where there are no remaining rounds in the predetermined number of rounds and the game continues, the user terminal 10 performs the upload process on the progress data (Step S3-9). Specifically, the browser 11 of the user terminal 10 transmits the progress data to the management server 20. With this configuration, the battle view data of a new round can be acquired from the management server 20.

The above described embodiment may be modified as follows.

In the above embodiment, a predetermined number of rounds of the battle view data to be collectively transmitted by the management server 20 to the user terminal 10 is constant, but the predetermined number of rounds is not limited to a fixed value. For example, the predetermined number of rounds may vary according to the terminal attributes. In this case, the management server 20 stores a terminal attribute table. In the terminal attribute table, the predetermined number of rounds is recorded in association with the terminal attributes. In the terminal attribute table, the predetermined number of rounds in which usability such as a waiting time until the game starts is taken into consideration is recorded in a terminal status. For example, in a case where an information processing speed or a communication speed in the user terminal 10 is high, the number of rounds is set to be large. The controller 21 of the management server 20 performs a number of rounds determining process before the battle view data is transmitted.

Figure 5:
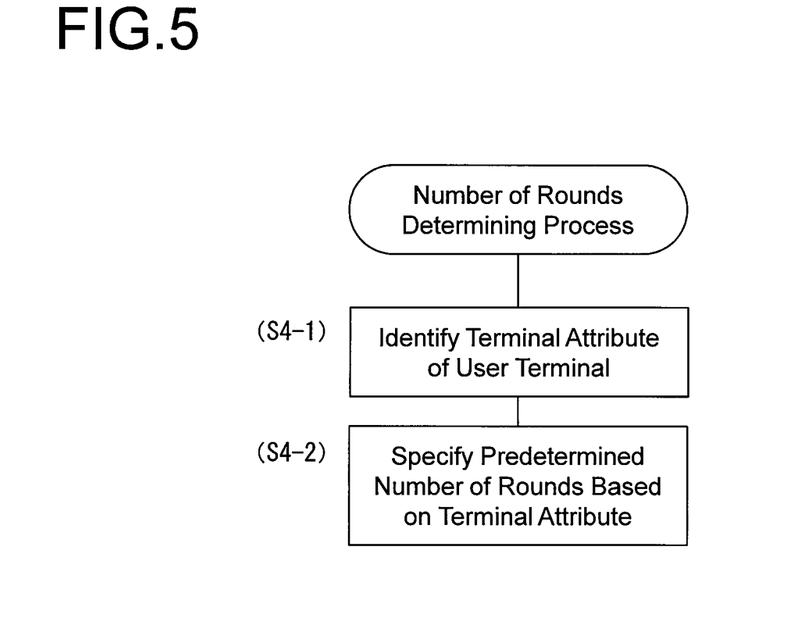
FIGS. 5 to 8 are explanatory diagrams describing procedures of a system of another embodiment.

The number of rounds determining process will be described with reference to FIG. 5.

First, the controller 21 of the management server 20 performs an identifying process of a terminal attribute of the user terminal (Step S4-1). Specifically, the game management section 212 of the controller 21 acquires attribute information of the user terminal 10 through the browser of the user terminal 10. Examples of the attribute information may include the OS version, the browser type, the terminal type, the communication circumstance, and the like.

Next, the controller 21 of the management server 20 performs a specifying process of the predetermined number of rounds based on the terminal attribute (Step S4-2). Specifically, the game management section 212 of the controller 21 determines the predetermined number of rounds using the terminal attribute table.

With this configuration, a plurality of pieces of battle view data can be collectively transmitted while taking the usability for the game user into consideration.

In the above embodiment, the predetermined number of rounds of the battle view data to be collectively transmitted by the management server 20 to the user terminal 10 is constant, but the predetermined number of rounds is not limited to a fixed value. For example, the predetermined number of rounds may vary according to user attributes. In this case, the management server 20 stores a user attribute table. In the user attribute table, the predetermined number of rounds is recorded in association with the user attributes. For example, in a case where the number of times of using the game recorded in the game information storage section 23 is large or in a case where the character of the user has a high level of skill, the number of rounds is set to be large. The controller 21 of the management server 20 performs the number of rounds determining process before the battle view data is transmitted.

Figure 6:
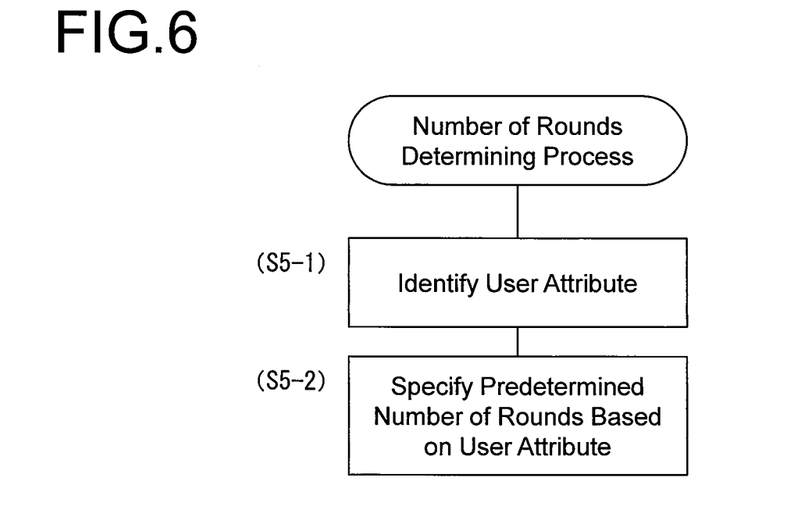

The number of rounds determining process will be described with reference to FIG. 6.

First, the controller 21 of the management server 20 performs an identifying process of a user attribute (Step S5-1). Specifically, the game management section 212 of the controller 21 acquires attribute information of the user by the game information storage section 23. Examples of the attribute information may include the number of times of using the game by the user, the level of the user, the various types of parameter values configured in the character of the user, and the like.

Next, the controller 21 of the management server 20 performs a specifying process of the predetermined number of rounds based on the user attribute (Step S5-2). Specifically, the game management section 212 of the controller 21 determines the predetermined number of rounds using the user attribute table.

With this configuration, a plurality of pieces of battle view data can be collectively transmitted while taking the user into consideration.

Further, an upper limit of the number of transmittable rounds may be set according to the terminal attribute. In this case, the predetermined number of rounds can be determined according to the user attribute at a value equal to or less than the upper limit value of the number of rounds.

In the above embodiment, the predetermined number of rounds of the battle view data to be collectively transmitted by the management server 20 to the user terminal 10 is constant, but the predetermined number of rounds is not limited to a fixed value. For example, the predetermined number of rounds may vary according to the relationship between each round and the proceeding or succeeding round thereof. In this case, the content storage section 24 stores relevance information of each round. In the relevance information, information to be used for identifying the rounds to be collectively transmitted and rounds to be transmittable in a division manner is recorded. The controller 21 of the management server 20 performs the number of rounds determining process before the battle view data is transmitted.

Figure 7:
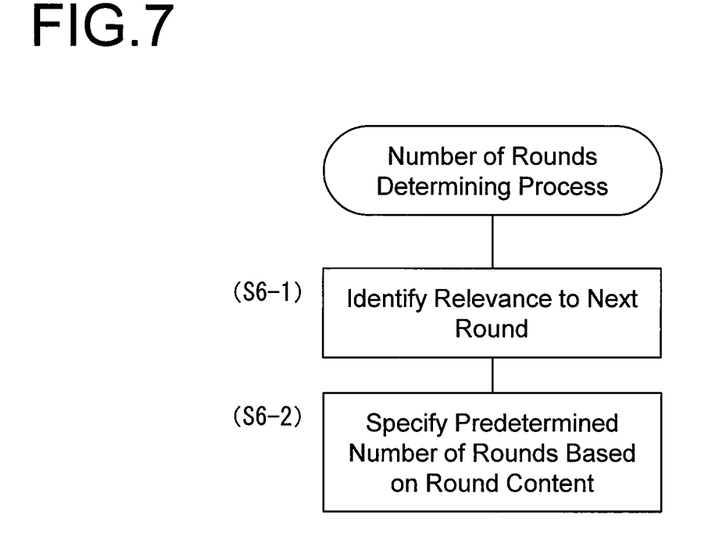

The number of rounds determining process will be described with reference to FIG. 7.

First, the controller 21 of the management server 20 performs an identifying process of relevance between the last round and the next round (Step S6-1). Specifically, the game management section 212 of the controller 21 identifies the battle view data of a predetermined number of rounds. Next, the game management section 212 acquires the relevance information between the last round of the battle view 505 and the next round. In a case where the relevance is high, the next round is added to a transmission target. Subsequently, the operation in which the next round is specified and a round having high relevance is added is sequentially repeated.

Next, the controller 21 of the management server 20 performs a specifying process of a predetermined number of rounds based on the content of the round (Step S6-2). Specifically, the game management section 212 of the controller 21 specifies the number of rounds counted until a round having low relevance is detected as the predetermined number of rounds.

With this configuration, the rounds having high relevance are collectively transmitted, and can be continuously used in the user terminal 10.

In the above embodiment, in a case where the game is performed, the predetermined number of rounds of the battle view data to be collectively transmitted to the user terminal 10 by the management server 20 is constant. The predetermined number of rounds is not limited to a fixed value. For example, the predetermined number of rounds may be determined according to user's desire (a desired number of rounds). In this case, the game management section 212 stores an upper limit value of the number of downloadable rounds according to the type of the game. The controller 21 of the management server 20 performs the number of rounds determining process before the battle view data is transmitted.

Figure 8:
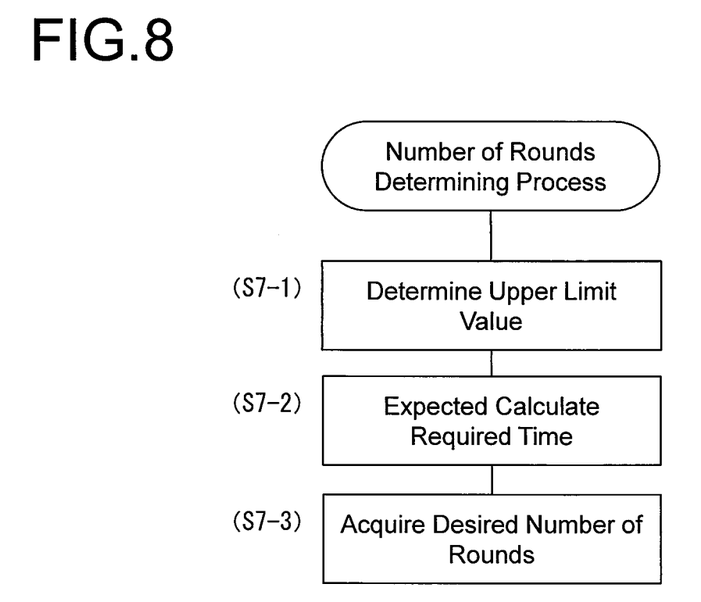

The number of rounds determining process will be described with reference to FIG. 8.

First, the controller 21 of the management server 20 performs a determining process of an upper limit value (Step S7-1). Specifically, the game management section 212 of the controller 21 specifies the upper limit value of the predetermined number of rounds which can be collectively downloaded according to a desired game.

Next, the controller 21 of the management server 20 performs a calculation process of a required time that is expected to be necessary for the download (Step S7-2). Specifically, the game management section 212 of the controller 21 calculates the required time necessary for downloading rounds as many as the upper limit value according to the terminal attribute.

Next, the controller 21 of the management server 20 performs an acquisition process of the desired number of rounds equal to or less than the upper limit value from the user terminal 10 (Step S7-3). Specifically, the game management section 212 of the controller 21 outputs a number of rounds determination view to the user terminal 10. The number of rounds determination view includes a setting column through which the number of rounds to be collectively downloaded is input. In the setting column, the number of rounds can be designated up to the upper limit value. In addition, the number of rounds determination view displays the required time which is expected to be needed for downloading the rounds as many as the upper limit value. The required time thus expected is calculated by the game management section 212 based on the amount of the battle view data and the terminal attributes (communication circumstance). The user sets the desired number of rounds to the setting column of the number of rounds determination view. In this case, the game management section 212 performs a collective download using the number of rounds input in the setting column as the predetermined number of rounds.

In the above embodiment, in a case where it is determined that there are no remaining rounds in the predetermined number of downloaded rounds ("NO" in Step S3-5), the user terminal 10 performs the intermediate result view displaying process (Step S3-7). An output timing of the intermediate result view 510 is not limited to a time when the user wins the battle of the predetermined number of rounds. For example, the intermediate result view 510 may be displayed in each round when the user wins the battle.

In the above embodiment, the intermediate result view 510 includes intermediate result information, an achieved round count, and an icon for checking the user of his/her willingness to continue with the battle. The intermediate result information, the achieved round count, and an indication for asking a user's willingness of continuing with the battle may be included in the load view 504.

The invention claimed is:

1. A method comprising:
   by a controller, collectively transmitting game view data of a game involving multiple opponents and having a set of a plurality of rounds to a user terminal, the game view data corresponding to a first subset of rounds including a predetermined number of rounds in the plurality of rounds;
   identifying a terminal attribute of the user terminal;
   determining the predetermined number based on the terminal attribute; and
   responsive to detecting that the first subset of the rounds is completed, collectively transmitting, to the user terminal, game view data corresponding to a second subset of rounds including the predetermined number of rounds subsequent to the completed rounds.

2. The method according to claim 1, further comprising transmitting view data presenting intermediate result information to the user terminal, responsive to detecting that the first subset of the rounds is completed.

3. The method according to claim 1, further comprising transmitting, to the user terminal, view data for checking a user of his/her willingness to continue with a battle, responsive to detecting that the first subset of the rounds is completed.

4. The method according to claim 1, further comprising transmitting view data for informing a user of an achieved round count to the user terminal, responsive to detecting that the first subset of the rounds is completed.

5. The method according to claim 1, further comprising, responsive to detecting that the first subset of the rounds is completed:
   identifying a user related to the user who uses the user terminal;
   identifying a progress status of the game of the related user; and
   transmitting, to the user terminal, view data for informing progress information of the game of the related user.

6. The method according to claim 1, further comprising:
   retrieving a user attribute of the user who uses the user terminal; and
   determining the predetermined number based on the user attribute.

7. The method according to claim 1, further comprising:
   retrieving relevance to a newly transmitted round; and
   determining the predetermined number based on the relevance such that the subset of rounds includes a round having high relevance.

8. The method according to claim 1, further comprising:
   specifying an upper limit value of the predetermined number of the rounds in the game; and
   determining a desired number of rounds as the predetermined number when the desired number of rounds equal to or less than the upper limit value is acquired from the user terminal.

9. A computer, comprising
   a controller operative to collectively transmit game view data of a game involving multiple opponents and having a set of a plurality of rounds to a user terminal, the game view data corresponding to a first subset of rounds including a predetermined number of rounds in the plurality of rounds;
   identifying a terminal attribute of the user terminal;
   determining the predetermined number based on the terminal attribute; and
   responsive to detecting that the first subset of the rounds is completed, collectively transmitting, to the user terminal, game view data corresponding to a second subset of rounds including the predetermined number of rounds subsequent to the completed rounds.

10. A non-transitory computer-readable storage medium with a program stored therein for executing a method comprising:
   by a controller, collectively transmitting game view data of a game involving multiple opponents and having a set of a plurality of rounds to a user terminal, the game view data corresponding to a first subset of rounds including a predetermined number of rounds in the plurality of rounds;

identifying a terminal attribute of the user terminal;

determining the predetermined number based on the terminal attribute; and responsive to detecting that the first subset of the rounds is completed, collectively transmitting game view data corresponding to a second subset of rounds including the predetermined number of rounds subsequent to the completed rounds to the user terminal.

* * * * *

(12) POST-GRANT REVIEW CERTIFICATE (183rd)

United States Patent
Miyayama et al.

(10) Number: US 9,675,886 J1
(45) Certificate Issued: Jun. 22, 2021

(54) METHOD, COMPUTER, AND PROGRAM FOR PROVIDING GAME (71) Applicants: Jun Miyayama; Michio Hara (72) Inventors: Jun Miyayama; Michio Hara (73) Assignee: GREE, INC.

Trial Number:

PGR2018-00050 filed Mar. 12, 2018

Post-Grant Review Certificate for:

Patent No.: 9,675,886
Issued: Jun. 13, 2017
Appl. No.: 14/467,244
Filed: Aug. 25, 2014

The results of PGR2018-00050 are reflected in this post-grant review certificate under 35 U.S.C. 328(b).

POST-GRANT REVIEW CERTIFICATE
U.S. Patent 9,675,886 J1
Trial No. PGR2018-00050
Certificate Issued Jun. 22, 2021

AS A RESULT OF THE POST-GRANT REVIEW PROCEEDING, IT HAS BEEN DETERMINED THAT:

Claims 1-10 are found patentable.

\* \* \* \* \*